(12) United States Patent
Thorland et al.

(10) Patent No.: US 7,173,655 B2
(45) Date of Patent: Feb. 6, 2007

(54) CAPTURE OF SENSORY DATA IN ASSOCIATION WITH DIGITAL STILL IMAGES

(75) Inventors: Miles Kevin Thorland, Fort Collins, CO (US); Norman Conrad Pyle, Greeley, CO (US); Amy E. Battles, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 755 days.

(21) Appl. No.: 10/274,182

(22) Filed: Oct. 18, 2002

(65) Prior Publication Data

US 2004/0075753 A1    Apr. 22, 2004

(51) Int. Cl.
*H04N 5/76* (2006.01)
*H04N 5/91* (2006.01)
*H04N 7/00* (2006.01)
*G03B 7/24* (2006.01)

(52) U.S. Cl. .............................. 348/231.4; 348/231.3; 396/312; 386/96

(58) Field of Classification Search ............ 348/231.4, 348/231.2, 231.3, 207.99, 220.1; 386/54, 386/107, 96, 104; 396/312
See application file for complete search history.

(56) References Cited

U.S. PATENT DOCUMENTS

| | | | |
|---|---|---|---|
| 5,367,332 A * | 11/1994 | Kerns et al. ................ 348/61 |
| 5,489,955 A * | 2/1996 | Satoh et al. ................ 396/312 |
| 5,521,638 A | 5/1996 | Dezaki et al. |
| 5,784,525 A * | 7/1998 | Bell ........................... 386/107 |
| 5,809,344 A | 9/1998 | Ishida et al. |
| 5,815,201 A | 9/1998 | Hashimoto et al. |
| 6,031,964 A | 2/2000 | Anderson |
| 6,072,645 A | 6/2000 | Sprague |
| 6,128,037 A * | 10/2000 | Anderson ................ 348/231.4 |
| 6,163,338 A * | 12/2000 | Johnson et al. ............. 348/148 |
| 6,374,054 B1 | 4/2002 | Schinner |
| 6,393,216 B1 | 5/2002 | Ootsuka et al. |
| 6,411,331 B1 | 6/2002 | Sansom-Wai et al. |
| 2004/0041922 A1* | 3/2004 | Norcross .................. 348/231.4 |

* cited by examiner

*Primary Examiner*—Ngoc-Yen Vu
*Assistant Examiner*—Gregory Madden

(57) ABSTRACT

Method and apparatus for capturing a variable length of sensory data in association with still image data. The sensory data are generated from a sensor signal beginning prior to capture of a still image and ending a selected period after capturing the still image. The sensory data are stored in temporary storage. Still image data are generated in response to a control signal to capture a still image, and the still image data are also stored in the temporary storage. A default portion of the sensory data in association with the image data is stored in non-volatile storage. The default portion of sensory data in non-volatile storage is conditionally replaced with a selected subset of the sensory data from the temporary storage if the user selects replacement.

37 Claims, 3 Drawing Sheets

CAPTURE OF SENSORY DATA IN ASSOCIATION WITH DIGITAL STILL IMAGES

BACKGROUND

Some digital still cameras support capturing sensory data, such as audio or video data in association with a still image. In many cameras the audio data are captured for a preset duration along with capturing an image. While other cameras require a user to initiate recording of sensory data after an image is captured. Even though both approaches have their merits, there are disadvantages with each.

In capturing sensory data for a preset duration, there may be sounds or video scenes that occur after the preset duration and that are suitable for association with the still image. Thus, the length of the preset duration will sometimes dictate whether the captured sensory data are useful. However, if the preset duration is too long, the captured sensory data are likely to include a substantial portion of undesirable sound.

The drawback to requiring the user to initiate sensory data capture upon image capture is that the user cannot predict the timing of the desired sensory data. For example, the desirable sensory data may occur prior to or contemporaneous with the capture of the still image. Thus, if sensory data are captured beginning only after the image has been captured, the desired audio will already have passed and go uncaptured. Recreating the sounds and video scenes of a moment may be impossible.

SUMMARY

In one embodiment, the invention provides a method and apparatus for capturing a sensory data in association with image data. Sensory data are generated from an audio signal beginning prior to capture of a still image and ending a selected period after capturing the image. The sensory data are stored in temporary storage. Still image data are generated in response to a control signal to capture an image, and the still image data are also stored in the temporary storage. A default portion of the sensory data, in association with the still image data, is stored in non-volatile storage. The default portion of sensory data in non-volatile storage is conditionally replaced with a selected subset of the sensory data from the temporary storage if the user selects replacement.

DETAILED DESCRIPTION

In various embodiments of the present invention, sensory data, such as audio or video data, are captured in association with a digital still image. The camera captures an extended length of sensory data and stores a selected portion of the sensory data in association with the still image. The full-length sensory data is temporarily saved for editing by the user. The user has the option of saving a subset of the sensory data other than the subset selected by the camera. For example, the user may select an entirely different portion of the full-length sensory data or even the entire full-length sensory data.

Figure 1:
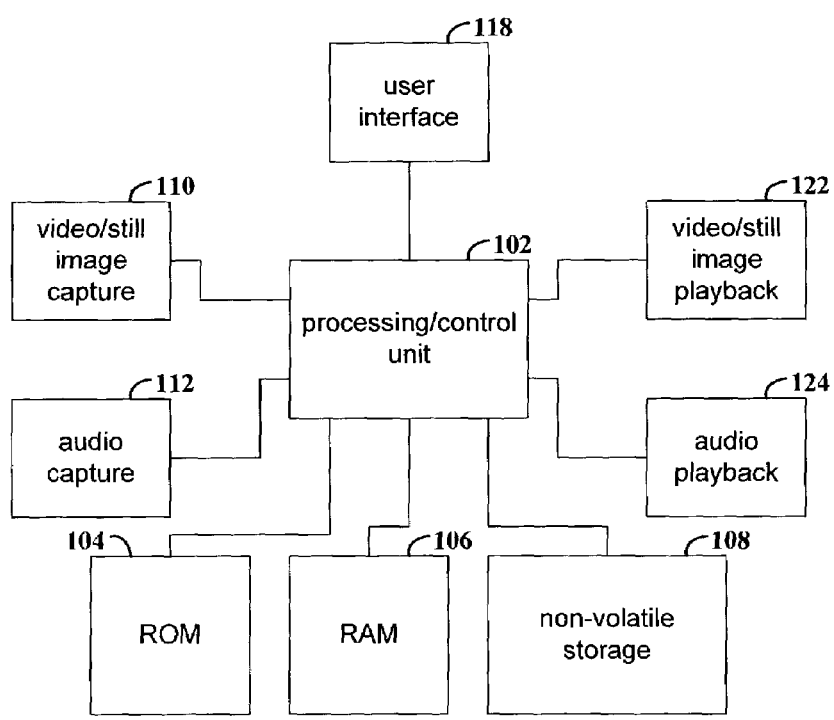
FIG. 1 is a functional block diagram of an example digital still camera.

FIG. 1 is a functional block diagram of an example digital still camera 100. Those skilled in the art will appreciate that digital camera 100 illustrates but one example of components comprising a digital camera and that alternative digital camera architectures could be adapted to operate in accordance with various embodiments of the present invention.

Central to operation of the digital camera is the processing/control unit 102. The processing/control unit typically controls most functions of the camera and is coupled to all the other functional units of the camera. The processor/control unit executes a set of control programs that are stored in an internal memory device, such as the ROM 104. The processor/control unit controls storage of raw video data, raw image data, and raw audio data in the RAM 106. The raw video data may be converted to a compressed form, for example, MPEG or another video data format, and stored in non-volatile storage 108. The raw image data may be converted to a compressed form, for example, JPEG, and the processed image data are stored in non-volatile storage 108. Similarly, the raw audio data may be converted to a standard format such as a WAV file. In one embodiment, non-volatile storage is a removable flash memory card. Those skilled in the art will recognize other suitable media for non-volatile storage.

The connections illustrate both data and control lines. While direct connections are shown, those skilled in the art will appreciate that some of the connections may be buffered or indirect. In addition, there are some connections between components that are not illustrated. For example, the video/still image capture 110 and audio capture 1 12 sections are coupled to the RAM 106 with control provided by the processing unit.

Video/still image capture section 110 includes a lens arrangement (not shown) that facilitates directing light to a photosensitive plane of a charge coupled device (CCD) or a CMOS sensor. An optical viewfinder enables a user to view a framed image, and an aperture is controlled by the processing/control unit to facilitate transmission of the proper amount of light to assure proper image formation. While not shown, it will be appreciated that the video/still image capture section includes circuitry for converting signals from the CCD into frames of video data. In an example embodiment, when the user initiates capture of a still image the camera saves a high-resolution frame of image data. The still image is high-resolution relative to the frames of video data being capture at the time of still image capture. In capturing frames of video data, the camera discards some of the pixel data in each frame. When the still image is captured, all of the pixel data in the corresponding frame of video data are saved as the still image data. Audio capture section 112 includes a microphone (not shown) and a suitable A/D converter (not shown) for converting the analog signal from the microphone to raw digital audio data.

The digital camera further includes a user interface 118 having a set of control switches. Example control switches include power on/off, mode selection switch, zoom in/out switch, live view, and shutter actuation. In addition, a LCD unit may be included to enable the user to view images in either a live view mode of operation or in a review mode of operation relative to still images and video data previously stored in the non-volatile storage.

The video/still image playback 122 and audio playback 124 sections include circuitry for converting the video/still image and audio data to analog signals for output to the user. As explained above, the video and image signals are output via the LCD unit (not shown) or to a connector for connection to an NTSC/PAL compatible device. The audio signal is output by built-in speaker (not shown) and as part of the NTSC/PAL signal.

In accordance with one embodiment of the invention, a control program executed by the processing/control unit 102 associates respective sets of sensory data with captured still images. The capture of sensory data begins at a selected time in association with capture of the still image and continues for a selected duration after the image is captured. The chosen duration is of sufficient length to ensure recording of video scenes and sounds that occur well after the image is captured but still possibly related to the captured image. Depending on implementation requirements and user preferences, the capture of the sensory data may commence before capturing the image or shortly after capture of the image. In one embodiment, the capture of sensory data is triggered by the position of the shutter release. Alternatively, the digital camera includes a record-control switch coupled to the processing/control unit, which initiates data capture in response to activation of the switch.

In yet another embodiment the user is allowed to save either a subset of the extended length sensory data or a default portion thereof. Thus, the sensory data associated with an image is not limited to video scenes and sounds occurring contemporaneously with still image capture, nor limited to video scenes and sounds occurring within a brief period, nor tightly constrained by camera-selected recording intervals. In another embodiment, the camera includes mode selection circuitry that allows the user to choose whether sensory data is captured at all, a default length of sensory data is automatically captured and saved, or an extended length of sensory data is captured.

Figure 2:
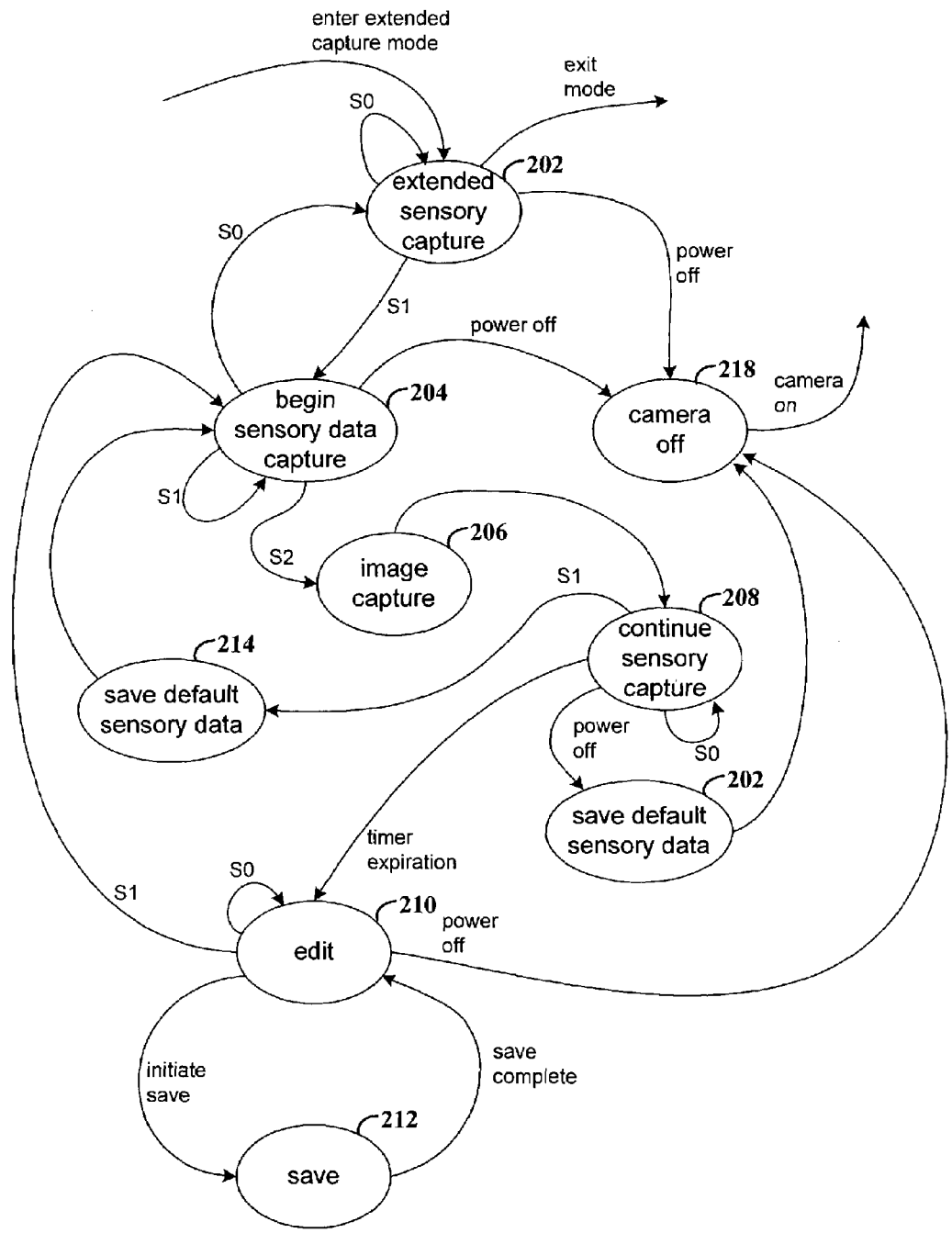
FIG. 2 is a state diagram that illustrates the operational states of a digital camera while operating in a mode for extended capture of sensory data in accordance with an example embodiment of the invention.

FIG. 2 is a state diagram that illustrates the operational states of a digital camera while operating in a mode for extended capture of sensory data in accordance with an example embodiment of the invention. The ellipses represent operational states of the camera in which the camera performs various functions related to the extended capture of sensory data. The directional lines that connect the ellipses represent user actions or camera events that cause the camera to transition from one operational state to another. It will be appreciated that the state diagram is not intended as an exhaustive illustration of all possible operational states of a digital camera. Rather, the diagram is intended to illustrate the interplay between certain basic camera operations and the extended capture mode.

Ellipse 202 represents the initial state of the camera when extended capture of sensory data is selected. It will be appreciated that this mode may be a default set by the camera or selected by the user after the camera is turned on. In this operational state, the camera is essentially idle waiting for a user-initiated control.

If the user depresses the shutter release to the S1 position, the camera transitions to state 204. Those skilled in the art will appreciate that the S0 position is where the shutter release button is not depressed, the S1 position is where the shutter release button is partially depressed (usually engaging autofocus and auto-metering functions if present), and the S2 position is where the shutter release button is fully depressed and still image data are captured. In another embodiment (not shown), a separate user interface button is provided for initiating capture of sensory data. The separate button permits the user to capture scenes and sounds occurring well before the still image is captured. In yet another embodiment (not shown), the capture of video and audio data is controlled separately. That is, the user can select to store video or audio data independent of whether the other type of data are captured.

Prior to commencing capture of sensory data, the processing/control unit 102 allocates portions of RAM 106 for storage of still image data and associated sensory data. The particular method for managing the memory will vary according to implementation requirements. However, it will be appreciated that respective pointers will be established for referencing the memory locations at which the still image data, video data, and audio data are stored.

In state 204, the camera begins capturing sensory data (e.g., audio, video, or both). If the shutter release remains at S1, the capture of sensory data continues. If the shutter release returns to S0, capturing of the sensory data stops and the camera transitions back to state 202. If the shutter release is moved to S2, the camera transitions to state 206, where image data are captured, capture of sensory data continues, and a timer is started. The timer is used to control the duration of capturing the sensory data. When the shutter release button is at the S2 position, still image data are captured and temporarily stored in the RAM. The camera transitions to state 208 and continues to capture sensory data as long as the shutter release does not transition to S1 or the timer expires.

In one embodiment, the sensory data are stored in circular buffers. The sizes of the buffers are sufficient to provide storage of sensory data captured well before and after the capture of image data. For example, instead of a short 15 second interval, the buffers have space for sensory data captured over a 60–90 second interval.

When the timer expires, the camera stops capturing sensory data and transitions to state 210 in which the sensory data can be edited. A default portion of the sensory data is automatically saved in non-volatile storage in association with the image upon entering state 210. Based on user controls, a different portion of the sensory data can be selected. If the user issues a save control, the camera transitions to state 212 for saving the selected portion of the sensory data. Before saving the selected portion, the default portion is moved to a temporary storage area so that it can be recovered if the user wants to revert back to the default portion. When the selected portion has been saved in association with the image, the camera transitions back to state 210.

If the shutter release is moved to S1, the camera transitions back to state 204 where capture of a new segment of sensory data begins.

If in state 208, after capturing image data and continuing capture of sensory data, the shutter release is moved to S1, the camera transitions to state 214 where a default portion of the sensory data is saved in association with the image. The camera then moves to state 204 where capture of a new segment of sensory data begins.

If in state 208 a power-off control is initiated, the camera moves to state 216 where a default portion of the sensory data is saved in association with the image. The camera then moves to state 218 where the camera is in a power-off state.

Figure 3:
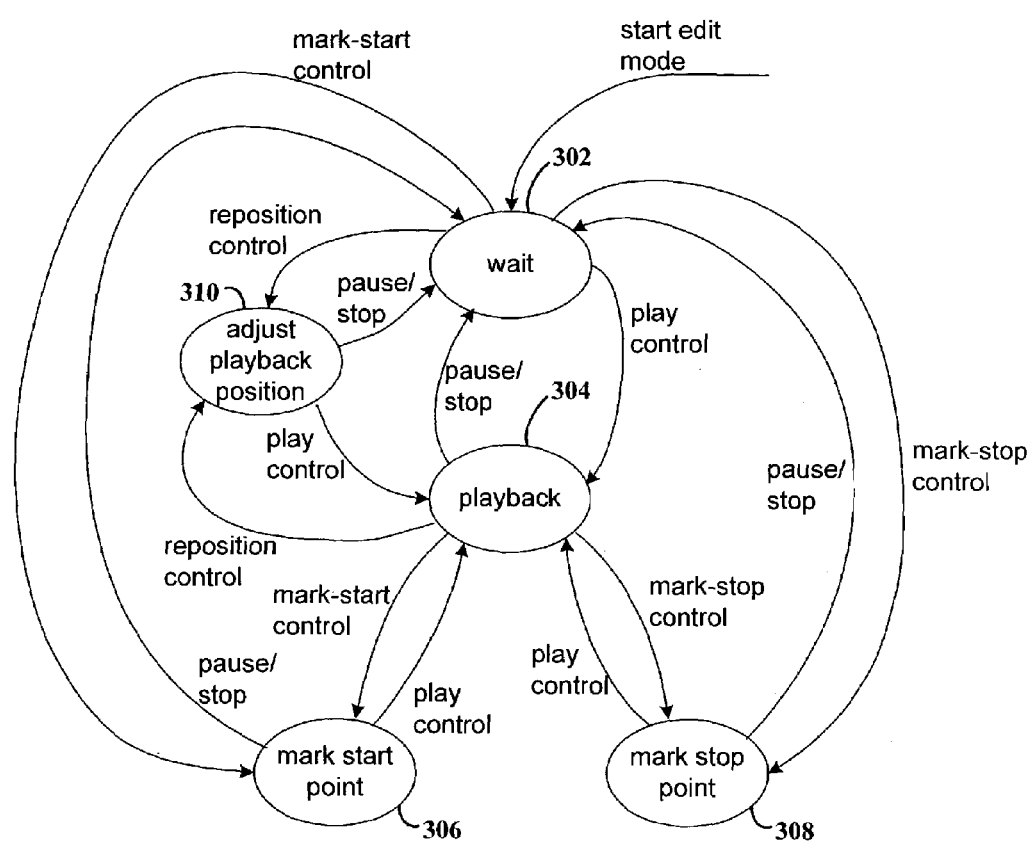
FIG. 3 is a state diagram associated with an example digital still camera involved in selecting a subset of sensory data ("editing") associated with an image.

FIG. 3 is a state diagram associated with an example digital still camera involved in selecting a subset of sensory data ("editing") associated with a still image. Those skilled in the art will appreciate that several alternative control mechanisms are suitable for editing the sensory data, depending on design and implementation requirements. For example, in one embodiment the editing controls include buttons on the camera for playing, pausing, stopping, repositioning a playback cursor, and marking the start point and stop point of the subset of sensory data within the full-length set of sensory data. A visual display in the viewfinder indicates the current playback position, start and stop points, and various other control status messages. It will be appreciated that the editing controls shown in FIG. 3 are applicable to both video and audio data. Depending on design requirements, the video and audio data may be separately editable or editable together.

The nodes of the state diagram indicate a state in editing the sensory data. The transitions between states signify a user-selected editing control function. When the user initiates the mode for editing the sensory data, the camera enters a wait state 302. From the wait state, the next state depends on the user-selected control function. If the user selects the play control function, the camera enters a playback state 304 where the sensory data are played back beginning at the position of the playback cursor. It will be appreciated that upon entering the edit mode the playback cursor is at the beginning of the sensory data.

While in the playback state, the user has the option to mark a starting point or mark an ending point of the subset of sensory data to be saved. These control functions lead to the mark start point and mark stop point states 306 and 308, respectively. From each of these states, the user has the option to resume playing the sensory data or pausing or stopping the playback. The pause/stop control returns the camera to the wait state 302. The pause/stop control is also available while in the playback state.

From the wait state and playback state, the user has the option to adjust the position of the playback cursor. Selection of the reposition control function causes the playback cursor to be positioned in the sensory data in the position selected by the user (adjust playback position state 310). If playback is then selected, playback resumes at the position of the playback cursor in playback state 304.

The present invention is believed to be applicable to a variety of arrangements for capturing still image and associated video and audio data and has been found to be particularly applicable and beneficial in digital still cameras. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of operating a digital camera, comprising:
   generating sensory data from a sensor signal beginning at a selected time associated with capture of a still image and ending a selected period after capturing the still image, and storing the sensory data in temporary storage;
   generating still image data in response to a control signal to capture an image, and storing the still image data in the temporary storage;
   storing a default portion of the sensory data in association with the still image data in non-volatile storage; and
   conditionally replacing the default portion of sensory data in non-volatile storage with a selected subset of the sensory data from the temporary storage if the user selects replacement.

2. The method of claim 1, wherein the subset of the sensory data from the temporary storage that replaces the default portion of sensory data in non-volatile storage includes all the sensory data in temporary storage.

3. The method of claim 1, wherein the selected period has a beginning and an end, and the subset of the sensory data from the temporary storage that replaces the default portion of sensory data in non-volatile storage spans from the beginning of the selected period to a time before the end of selected period.

4. The method of claim 1, wherein the selected period has a beginning and an end, and the subset of the sensory data from the temporary storage that replaces the default portion of sensory data in non-volatile storage spans from a time after the beginning of the selected period to a time before the end of selected period.

5. The method of claim 1, wherein the selected period has a beginning and an end, and the subset of the sensory data from the temporary storage that replaces the default portion of sensory data in non-volatile storage spans from a time after the beginning of the selected period to the end of selected period.

6. The method of claim 1, further comprising storing the sensory data in a circular buffer in temporary storage.

7. The method of claim 1, wherein the sensory data comprises audio data.

8. The method of claim 1, wherein the sensory data comprises video data.

9. The method of claim 1, wherein the sensory data comprises audio data and video data.

10. The method of claim 1, wherein the selected time at which generation of sensory data begins is before capture of the still image.

11. The method of claim 10, wherein the camera includes a shutter release with associated S0, S1, and S2 states, the method further comprising commencing sensory data capture when the shutter release is in the S1 state.

12. The method of claim 11, further comprising overwriting the sensory data in temporary storage when sensory data capture commences for another image.

13. The method of claim 1, wherein the selected time at which generation of sensory data begins is after capture of the still image.

14. The method of claim 13, wherein the camera includes a shutter release with associated S0, S1, and S2 states, the method further comprising commencing sensory data capture when the shutter release is in the S2 state.

15. The method of claim 14, further comprising overwriting the sensory data in temporary storage when sensory data capture commences for another image.

16. The method of claim 1, wherein the camera includes a record-control switch, the method further comprising commencing sensory data capture when the record-control switch is activated.

17. A digital camera, comprising:
   means for generating sensory data from a sensor signal beginning at a selected time associated with capturing a still image and ending a selected period after capturing the still image, and storing the sensory data in temporary storage;
   means for generating still image data in response to a control signal to capture an image, and storing the still image data in the temporary storage;
   means for storing a default portion of the sensory data in association with the still image data in non-volatile storage; and
   means for conditionally replacing the default portion of sensory data in non-volatile storage with a selected subset of the sensory data from the temporary storage if the user selects replacement.

18. A digital camera, comprising:
a processing unit;
a user interface coupled to the processing unit;
a memory arrangement coupled to the processing unit;
an image-capture circuit arrangement coupled to the processing unit and configured to capture still image data in response to user control actions;
an audio-capture circuit arrangement coupled to the processing unit and configured to capture audio data; and
wherein the processing unit is configured to initiate capture of audio data beginning at a selected time associated with capture of still image data and ending a selected period after capture of the still image data, and temporarily store the audio data in the memory arrangement, permanently store a default portion of the audio data in association with the still image data in the memory arrangement, and conditionally replace the default portion of audio data with a selected subset of the temporarily-stored audio data in response to user control.

19. The camera of claim 18, wherein the selected time at which capture of audio data begins is before capture of the still image.

20. The camera of claim 19, further comprising a shutter release with associated S0, S1, and S2 states, wherein the processing unit is further configured to commence capture of audio data when the shutter release is in the S1 state.

21. The camera of claim 20, wherein the processing unit is further configured to overwrite the temporarily stored audio data when audio data capture commences for another image.

22. The camera of claim 18, wherein the selected time at which capture of audio data begins is after capture of the still image.

23. The camera of claim 22, further comprising a shutter release with associated S0, S1, and S2 states, wherein the processing unit is further configured to commence audio data capture when the shutter release is in the S2 state.

24. The camera of claim 23, wherein the processing unit is further configured to overwrite the temporarily stored audio data when audio data capture commences for another image.

25. The camera of claim 18, further comprising a record-control switch, wherein the processing unit is further configured to commence audio data capture when the record-control switch is activated.

26. A digital camera, comprising:
a processing unit;
a user interface coupled to the processing unit;
a memory arrangement coupled to the processing unit;
an image-capture circuit arrangement coupled to the processing unit and configured to capture video data and still image data in response to user control actions;
an audio-capture circuit arrangement coupled to the processing unit and configured to capture audio data; and
wherein the processing unit is configured to initiate capture of audio data and video data beginning at a selected time associated with capture of still image data and ending a selected period after capture of the still image data, and temporarily store the video data and audio data in the memory arrangement, permanently store a default portion of the video data and audio data in association with the still image data in the memory arrangement, and conditionally replace the default portion of the video data and audio data with selected subsets of the temporarily-stored video data and audio data in response to user control.

27. The camera of claim 26, wherein the selected time at which capture of video data and audio data begins is before capture of the still image.

28. The camera of claim 27, further comprising a shutter release with associated S0, S1, and S2 states, wherein the processing unit is further configured to commence capture of video data and audio data when the shutter release is in the S1 state.

29. The camera of claim 28, wherein the processing unit is further configured to overwrite the temporarily stored video data and audio data when capture of video data and audio data commences for another image.

30. The camera of claim 26, wherein the selected time at which capture of video data and audio data begins is after capture of the still image.

31. The camera of claim 30, further comprising a shutter release with associated S0, S1, and S2 states, wherein the processing unit is further configured to commence capture of video data and audio data when the shutter release is in the S2 state.

32. The camera of claim 31, wherein the processing unit is further configured to overwrite the temporarily stored video data and audio data when capture of video data and audio data commences for another image.

33. The camera of claim 26, further comprising a record-control switch, wherein the processing unit is further configured to commence capture of video data and audio data when the record-control switch is activated.

34. A method of operating a digital camera having a shutter release, comprising:
generating at least one of audio and video data from a sensor signal beginning in response to the shutter release moving from a position of not depressed to a position of partially depressed, and ending after capturing a still image, and storing the at least one of audio and video data in temporary storage within the digital camera;
generating still image data in response to the shutter release moving from the partially depressed position to a fully depressed position, and storing the still image data in the temporary storage;
storing a default portion of the at least one of audio and video data in association with the still image data in non-volatile storage within the digital camera;
playing back on the camera the least one of audio and video data in response to a first user control input;
marking a start point in the at least one of audio and video data in response to a second user control input during playing back;
marking a stop point in the at least one of audio and video data in response to a third user control input during playing back; and
replacing, in response to a fourth user control input, the default portion of the at least one of audio and video data in non-volatile storage with a portion of the at least one of audio and video data in the temporary storage marked by the start point and stop point.

35. The method of claim 34, further comprising before replacing, moving the default portion of the at least one of audio and video data in non-volatile storage to a temporary storage area.

36. The method of claim 34, further comprising ceasing to generate the at least one of audio and video data in response to the movement of the shutter release from fully depressed, to not depressed, to partially depressed.

37. The method of claim 34, further comprising:
starting a timer in response to the shutter release moving from the partially depressed position to the fully depressed position; and ceasing to generate the at least one of audio and video data in response to expiration of the timer.

* * * * *